United States Patent
Hirosawa (10) Patent No.: US 9,448,435 B2
(45) Date of Patent: Sep. 20, 2016

(54) LIQUID CRYSTAL DISPLAY DEVICE

(71) Applicant: Japan Display Inc., Minato-ku (JP)

(72) Inventor: Jin Hirosawa, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 211 days.

(21) Appl. No.: 14/469,967

(22) Filed: Aug. 27, 2014

(65) Prior Publication Data

US 2015/0070620 A1   Mar. 12, 2015

(30) Foreign Application Priority Data

Sep. 9, 2013   (JP) .................................. 2013-186132

(51) Int. Cl.
  *G02F 1/1343* (2006.01)
  *G02F 1/1335* (2006.01)
  *G02F 1/139* (2006.01)

(52) U.S. Cl.
  CPC ....... *G02F 1/133555* (2013.01); *G02F 1/1393* (2013.01); *G02F 1/134363* (2013.01); *G02F 2001/134381* (2013.01)

(58) Field of Classification Search
  None
  See application file for complete search history.

(56) References Cited

U.S. PATENT DOCUMENTS

| 8,873,008 B2 | 10/2014 | Yamamoto et al. |
| 2013/0314637 A1 | 11/2013 | Hirosawa |
| 2013/0321727 A1 | 12/2013 | Morita et al. |
| 2013/0329156 A1 | 12/2013 | Hirosawa |
| 2014/0118651 A1 | 5/2014 | Hirosawa |

FOREIGN PATENT DOCUMENTS

JP   2010-85709   4/2010

*Primary Examiner* — Richard Kim (74) *Attorney, Agent, or Firm* — Oblon, McClelland, Maier & Neustadt, L.L.P (57) ABSTRACT

In a first substrate, a reflective first common electrode is located on the first and second source lines and extending toward a region between the first and second source lines so as to form an aperture portion. A transmissive pixel electrode is arranged in a pixel defined by the first gate line, the second gate line, the first source line and the second source line and electrically connected with a switching element. The transmissive pixel electrode includes a first end extending along the first and second source lines so as to face the first common electrode. A second substrate includes a second common electrode arranged facing the pixel electrode and set to the same potential as the first common electrode. A liquid crystal layer is held between vertical alignment films formed on the first substrate and the second substrate.

14 Claims, 6 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2013-186132 filed Sep. 9, 2013, the entire contents of which are incorporated herein by reference.

FIELD

Embodiments described herein relate generally to a liquid crystal display device.

BACKGROUND

In recent years, a liquid crystal display device equipped with a switching element and a capacitance element, a structure using a vertical electric field mode such as VA (Vertical Aligned) mode is put in practical use. In the liquid crystal display device using the VA mode, liquid crystal molecules are alignment controlled by electric field formed between a pixel electrode formed on an array substrate and a counter electrode formed on the counter substrate.

In a liquid crystal display device using the VA mode and equipped with a transmissive display area and a reflective display area, a technique is developed, for example, in which the thickness of the liquid crystal layer is made substantially the same in the transmissive display area and the reflective display area.

By the way, in the active-matrix type liquid crystal display device, a storage capacitance is needed to hold a voltage impressed to the liquid crystal layer for a predetermined period. The storage capacitance is configured by a pair of electrodes and wirings facing each other interposing an insulating layer therebetween. At least one of the pixel electrodes and wirings configuring the storage capacitance is formed of materials having shielding characteristics and forms a shield layer crossing the pixel. Therefore, the structure results in decrease in an aperture ratio, a transmissivity, or brightness contributing to the display in each pixel. For this reason, it is desired to improve display grace while securing the capacitance required for the display.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

A liquid crystal display device according to an exemplary embodiment of the present invention will now be described with reference to the accompanying drawings wherein the same or like reference numerals designate the same or corresponding portions throughout the several views.

According to one embodiment, a liquid crystal display device comprises: a first substrate including; first and second gate lines extending in a first direction, first and second source lines extending in a second direction orthogonally crossing the first direction, a switching element electrically connected with the first gate line and the first source line, a reflective first common electrode located on the first and second source lines and extending toward a region between the first and second source lines so as to form an aperture portion, a transmissive pixel electrode arranged in a pixel defined by the first gate line, the second gate line, the first source line and the second source line and electrically connected with the switching element, the transmissive pixel electrode including a first end extending along the first and second source lines so as to face the first common electrode, and a first vertical alignment film, a second substrate including a second common electrode arranged facing the pixel electrode and set to the same potential as the first common electrode, and a second vertical alignment film covering the second common electrode; and a liquid crystal layer held between the first vertical alignment film and the second vertical alignment film.

According to other embodiment, a liquid crystal display device comprises: a first substrate including; first and second gate lines extending in a first direction, first and second source lines extending in a second direction orthogonally crossing the first direction, a switching element electrically connected with the first gate line and the first source line, a reflective first common electrode located on the first and second source lines extending toward a region between the first and second source lines so as to form an aperture portion, and the reflective first common electrode extending to adjacent pixels in the first direction, a transmissive pixel electrode arranged in a pixel defined by the first gate line, the second gate line, the first source line and the second source line and electrically connected with the switching element, wherein the transmissive pixel electrode includes a first end extending along the first and second source lines so as to face the first common electrode, and is arranged on the aperture portion of the first common electrode, and a first vertical alignment film, a second substrate including a second common electrode arranged facing the pixel electrode and set to the same potential as the first common electrode, and a second vertical alignment film covering the second common electrode; and a liquid crystal layer held between the first vertical alignment film and the second vertical alignment film, wherein the aperture portion of the reflective first common electrode forms a transmissive display region, and the first end of the transmissive pixel electrode arranged on the first common electrode forms a reflective display region.

Figure 1:
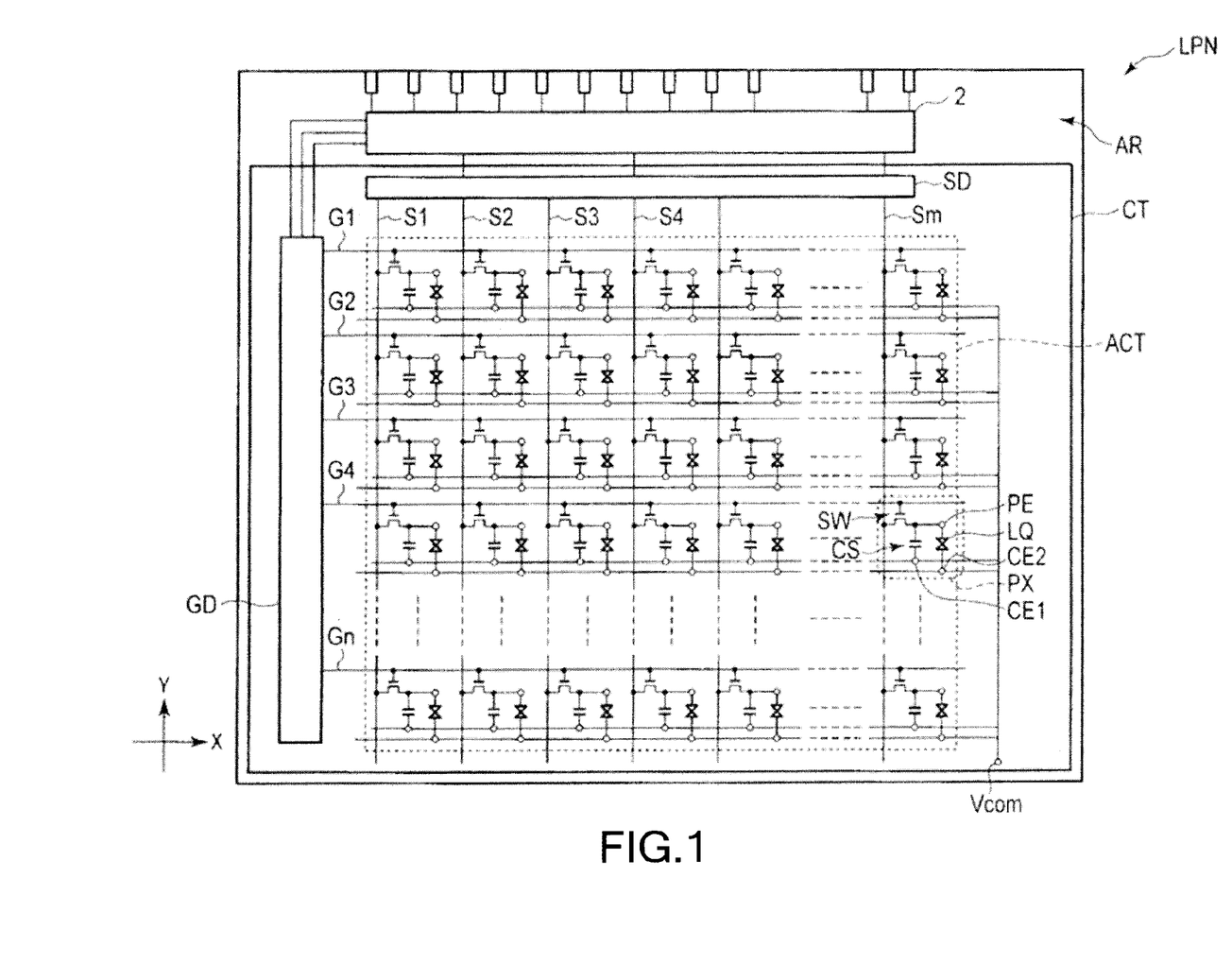
FIG. 1 is a figure schematically showing a structure and an equivalent circuit of a liquid crystal display device according to one embodiment.

FIG. 1 is a figure schematically showing a structure and an equivalent circuit of a liquid crystal display device according to one embodiment.

The liquid crystal display device includes an active-matrix type liquid crystal display panel LPN. The liquid crystal display panel LPN is equipped with an array substrate AR as a first substrate, a counter substrates CT as a second substrate arranged opposing the array substrate AR, and a liquid crystal layer LQ held between the array substrate AR and the counter substrate CT. The liquid crystal display panel LPN includes an active area ACT which displays images. The active area ACT corresponds to an area in which the liquid crystal layer LQ is held between the array substrate AR and the counter substrate CT, and is formed in a rectangular shape. The active area ACT is formed of a plurality of pixels PX arranged in a matrix shape.

The array substrate AR is equipped with a plurality of gate lines G (G1-Gn) extending in a first direction X, a plurality of source lines S (S1-Sm) extending in a second direction orthogonally crossing the first direction, a switching element SW electrically connected with the gate line G and the source line S, a pixel electrode PE electrically connected with the switching element SW in each pixel PX, a first common electrode CE1 facing a portion of the pixel electrode PE, etc. The storage capacitance CS is formed, for example, between the first common electrode CE1 and the pixel electrode PE.

On the other hand, the counter substrate CT is equipped with a second common electrode CE2, etc., facing the pixel electrode PE interposing the liquid crystal layer LQ therebetween.

Each gate line G is pulled out to outside of the active area ACT and connected to a first driver GD. Each source line S is pulled out to the outside of the active area ACT and connected to a second driver SD. At least portions of the first driver GD and the second driver SD are formed in the array substrate AR, for example, and connected with a driver IC chip 2. The driver IC chip 2 implements a controller for controlling the first driver circuit GD and the second circuit SD, and functions a signal source for supplying signals necessary to drive the liquid crystal panel LPN. In the illustrated example, the drive IC chip 2 is mounted on the array substrate AR in the outside of the active area ACT of the liquid crystal display panel LPN.

The first common electrode CE1 and the second common electrode CE2 are formed in common to a plurality of pixels PX. The first common electrode CE1 and the second common electrode CE2 are electrically connected mutually and set to the same potential. For example, the first common electrode CE1 and second common electrode CE2 are pulled out to the outside of the active area ACT and connected to an electric supply portion Vcom. The electric supply portion Vcom is formed in the array substrate AR, for example, on the outside of the active area ACT, and electrically connected with a second common electrode CE2 through an electric conductive element which is not illustrated while electrically being connected with the first common electrode CE1. In the electric supply portion Vcom, common potential is supplied to the first common electrode CE1 and the second common electrode CE2.

Figure 2:
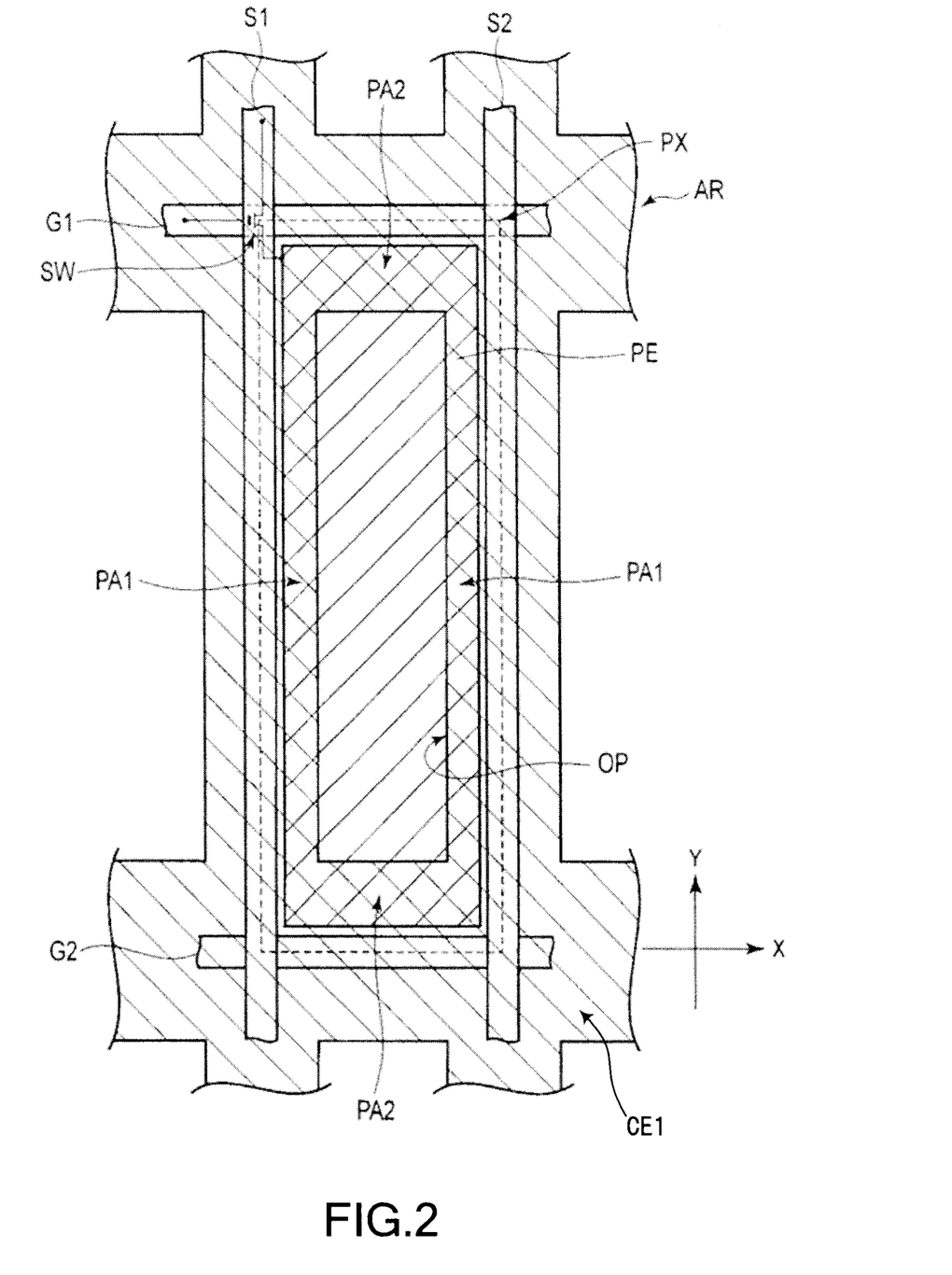
FIG. 2 is a plan view schematically showing a structure of one pixel PX in an array substrate AR applicable to the embodiment.

FIG. 2 is a plan view schematically showing a structure of one pixel PX in the array substrate AR applicable to the embodiment.

The array substrate AR is equipped with a gate line G1, a gate line G2, a source line S1, a source line S2, the switching element SW, the first common electrode CE1, the pixel electrode PE, etc.

The gate line G1 and the gate line G2 are arranged with a fixed distance therebetween along the second direction Y, and extends in the first direction X, respectively. The source line S1 and the source line S2 are arranged with a fixed distance therebetween along the first direction X, and extends in the second direction Y, respectively. In the illustrated example, the pixel PX is defined by the first gate line G1, the second gate line G2, the first source line S1, and the second source line S2, and formed in a rectangular shape which has a pair of long sides parallel to the second direction Y while having a pair of short ends parallel to the first direction X, as shown with a dashed line in the figure. As an example, the length of the long end in the second direction Y is about 3 times of the short end in the first direction X. Although not explained in detail, a unit pixel for displaying a color picture is formed of three pixels PX for displaying different colors respectively extending in the first direction X. The length in the first direction X of the pixel PX is equivalent to a pitch in the first direction X between the adjoining source line S1 and source line S2. The length in the second direction Y of the pixel PX is equivalent to a pitch in the second direction Y between the adjoining gate line G1 and the gate line G2.

In illustrated pixel PX, the source line S1 is arranged at the left-hand side end in the pixel PX. Precisely, the source line S1 is arranged striding over a boundary between the illustrated pixel PX and a pixel adjoining the illustrated pixel PX on the left-hand side. The source line S2 is arranged at the right-hand side end. Similarly, the source line S2 is arranged striding over a boundary between the illustrated pixel PX and a pixel adjoining the illustrated pixel PX on the right-hand side. The gate line G1 is arranged at the upper side end in the pixel PX. Precisely, the gate line G1 is arranged striding over a boundary between the illustrated pixel PX and a pixel adjoining the illustrated pixel PX on the upper side. The gate line G2 is arranged at the lower side end. Similarly, the gate line G2 is arranged striding over a boundary between the illustrated pixel PX and a pixel adjoining the illustrated pixel PX on the lower side. As illustrated, the auxiliary capacitance line crossing the pixel PX so as to form the storage capacitance is not provided in this embodiment.

For example, the switching element SW is constituted by n channel thin film transistor (TFT), and either a top gated-type or a bottom gated-type is used. The switching element SW is electrically connected with the gate line G1 and the source line S1. The switching element SW is equipped with a semiconductor layer, such as poly-silicon, for example.

While the first common electrode CE1 is arranged in one pixel PX, the first common electrode CE1 extends in the first direction X striding over the first source line S1 and the second source line S2 to the adjacent pixels PX. Similarly, the first common electrode CE1 extends in the second direction Y striding over the first gate line G1 and the second gate line G2 to the adjacent pixels PX.

In one pixel PX, while the first common electrode CE1 faces the first source line S1 and the second source line S2, the first common electrode CE1 extends to an inside region of the pixel PX between the first source line S1 and the second source line S2. Furthermore, while the first common electrode CE1 faces the first gate line G1 and the second gate line G2, the first common electrode CE1 extends to an inside region of the pixel PX between the first gate line G1 and the second gate line G2. That is, the first common electrode CE1 is formed in a matrix shape forming an rectangular aperture portion OP substantially in the center portion of the pixel PX. In addition, the first common electrode CE1 is formed in other pixels PX with the same shape, and arranged substantially on the entire surface of the active area.

In addition, the first common electrode CE1 may be formed in the shape of a stripe extending along the gate line for every row line. That is, the first common electrode CE1 may be cut on the gate lines. Similarly, the first common electrode CE1 may be formed in the shape of a stripe extending along the source line for every column line. That is, the first common electrode CE1 may be cut on the source lines.

The pixel electrode PE is formed in the shape of an island in one pixel PX. In addition, although only the pixel electrode PE arranged in one pixel PX is illustrated, the pixel electrodes in the same shape are arranged in other pixels which adjoin the illustrated pixel PX in the first direction X and the second direction Y. The pixel electrode PE is electrically connected with the switching element SW. The illustrated pixel electrode PE is formed in a rectangular shape in which the length in the first direction X is shorter than the length in the second direction Y corresponding to the form of the pixel PX. In addition, a portion of the pixel electrodes PE may extend so as to overlap with the source line S1, the source line S2, the gate line G1, or the gate line G2.

The pixel electrode PE includes a first end PA1 which counters the first common electrode CE1 along the source line S1 and the source line S2, respectively. Moreover, the pixel electrode PE includes a second end PA2 which counters the first common electrode CE1 along the gate line G1 and the gate line G2, respectively. That is, the four ends in the frame shape of the pixel electrode PE counters the first common electrode CE1 in this embodiment. As we see later, the area in which the pixel electrode PE overlaps the first common electrode CE1 turns into a reflective display area, and the area in which the pixel electrode PE overlaps the aperture portion OP turns into a transmissive display area.

Figure 3:
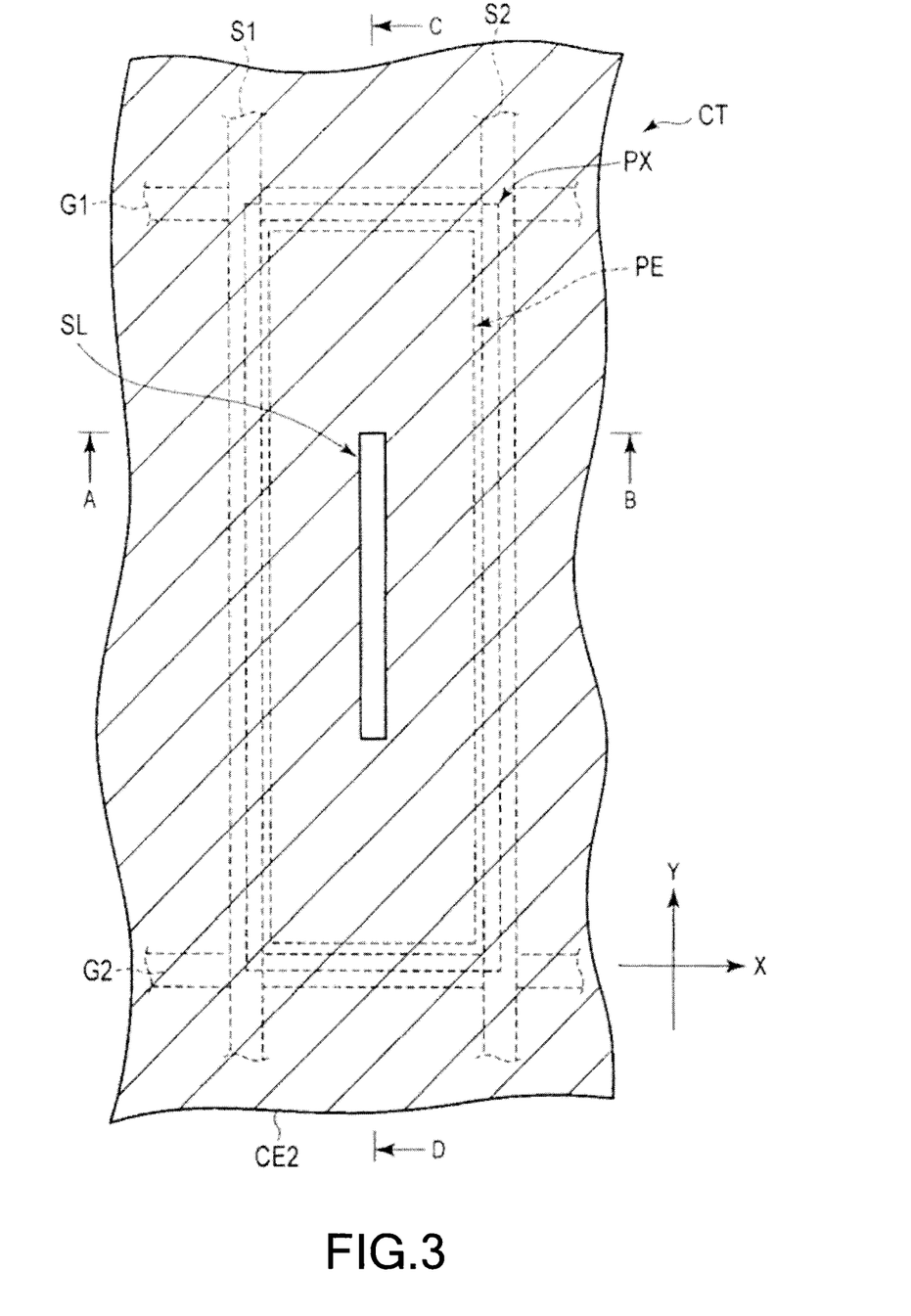
FIG. 3 is a plan view schematically showing a structure of one pixel PX in a counter substrate CT applicable to the embodiment.

FIG. 3 is a plan view schematically showing a structure of one pixel PX in the counter substrate CT applicable to the embodiment. In addition, only structure required for explanation is illustrated, and dashed lines show the source line S1, the source line S2, the gate line G1, the gate line G2, and the pixel electrode PE which are the principal portions of the array substrate, and the illustration of the first common electrode is omitted herein.

The counter substrate CT is equipped with a second common electrode CE2, etc.

The second common electrode CE2 is arranged in the pixel PX and counters the pixel electrode PE. The second common electrode CE2 extends in the first direction X and the second direction Y from the illustrated pixel PX, and is also located above the gate line G1 and the gate line G2, and the source line S1 and the source line S2. That is, although not explained in detail, the second common electrode CE2 extends to pixels which adjoins the illustrated pixel PX on the right-hand side and left-hand side in the first direction X, and pixels which adjoins the illustrated pixel PX in the upper portion and the bottom portion in the second direction Y. Furthermore, the second common electrode CE2 extends substantially in the whole active area.

In the second common electrode CE2, a slit SL is formed in a position which counters the pixel electrode PE. In the illustrated example, the slit SL is formed in the shape of a stripe extending in the second direction Y, and located substantially in the center of the pixel PX. The slit SL is equivalent to an alignment control element for controlling the alignment of the liquid crystal molecules. In addition, as long as it has function which controls the alignment of the liquid crystal molecules, other alignment control elements such as a projection laminated on the second common electrode CE2 may be used in place of the slit. Moreover, the shape of the slit SL may be a cross, not limited to the above example.

Figure 4:
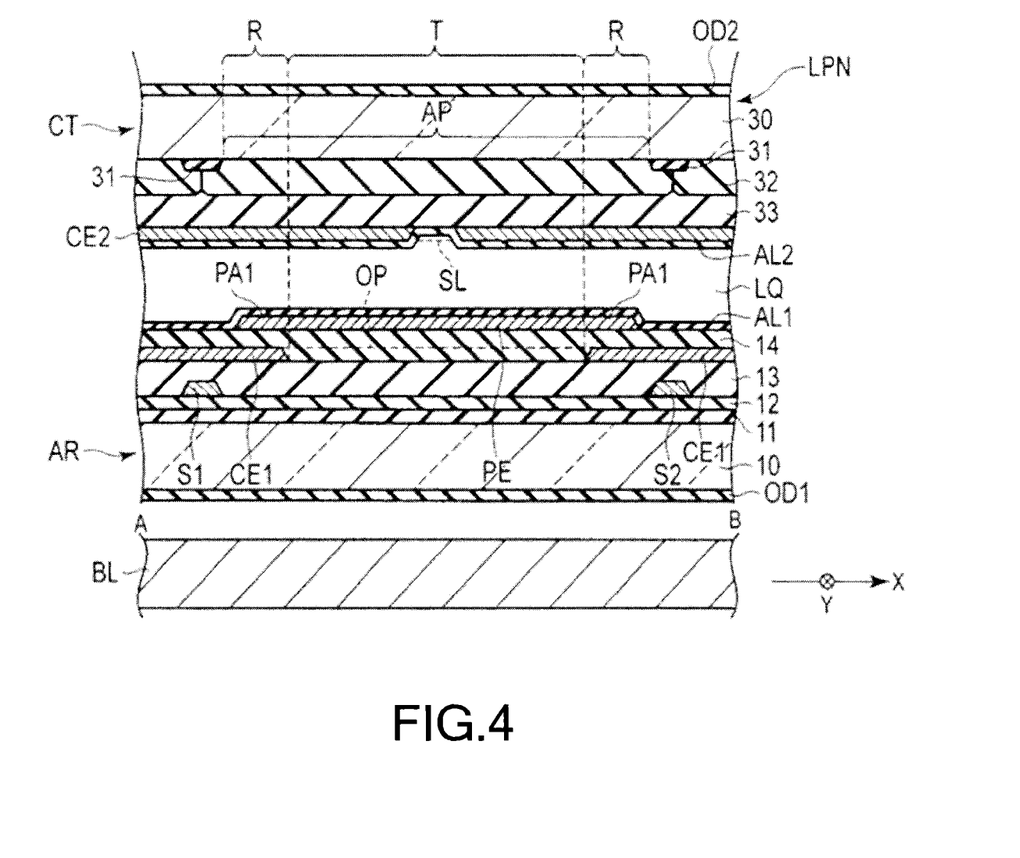
FIG. 4 is a cross-sectional view schematically showing the structure of the liquid crystal display panel LPN taken along line A-B shown in FIG. 3 according to a first embodiment.
Figure 5:
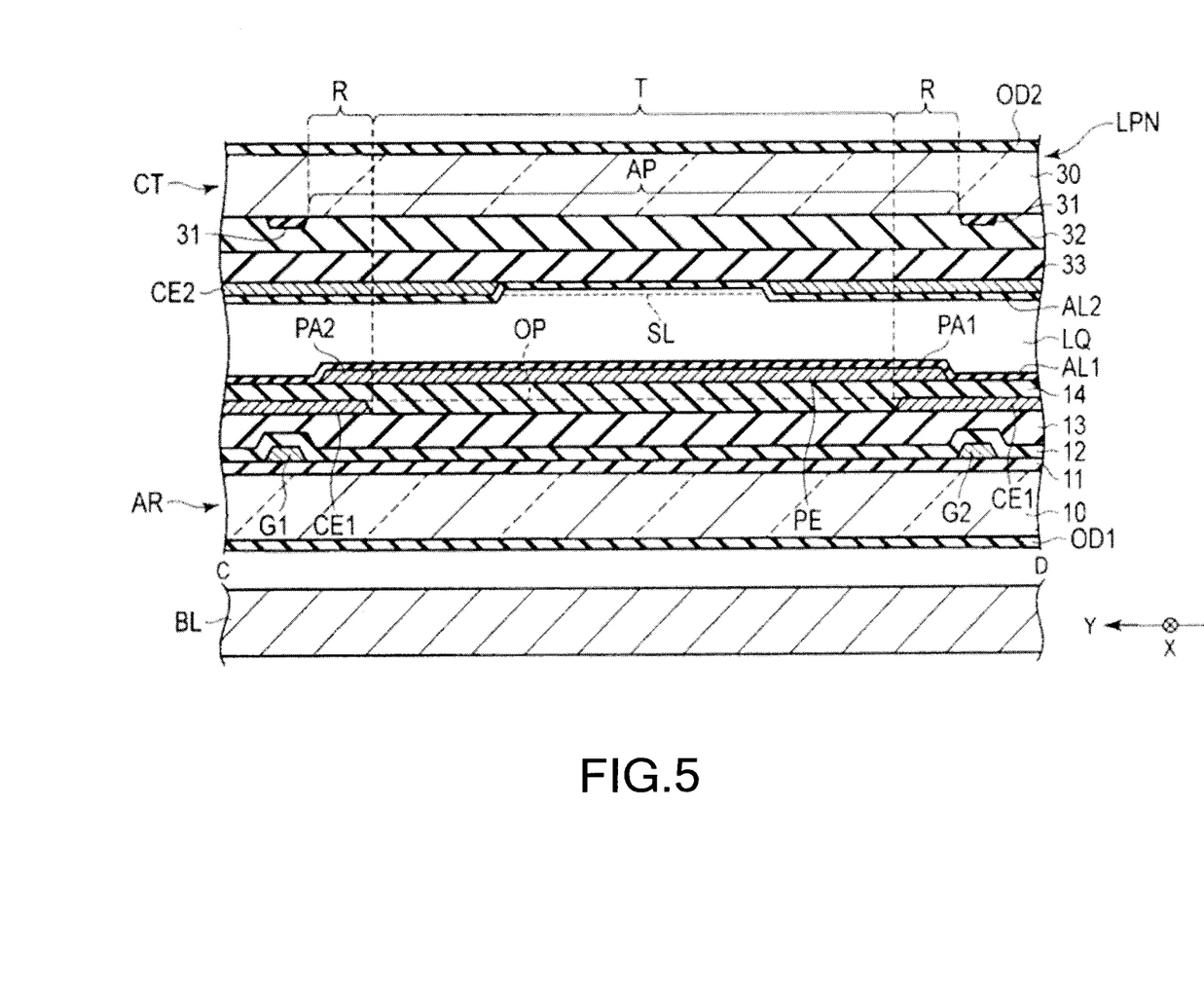
FIG. 5 is a cross-sectional view schematically showing the structure of the liquid crystal display panel LPN taken along line C-D shown in FIG. 3 according to a first embodiment.

FIG. 4 is a cross-sectional view schematically showing the structure of the liquid crystal display panel LPN taken along line A-B shown in FIG. 3 according to a first embodiment. FIG. 5 is a cross-sectional view schematically showing the structure of the liquid crystal display panel LPN taken along line C-D shown in FIG. 3 according to a first embodiment. In addition, only composition required for explanation is illustrated, and illustration of the switching element is omitted here.

The array substrate AR is formed using the first transparent insulating substrate 10, such as a glass substrate and a resin substrate. The array substrate AR includes the gate line G1, the gate line G2, the source line S1, the source line S2, the first common electrode CE1, the pixel electrode PE, the first insulating film 11, the second insulating film 12, a third insulating film (a first interlayer insulating film) 13, a fourth insulating film (a second interlayer insulating film) 14, and a first vertical alignment film AL1, etc., facing the counter substrate CT.

The semiconductor layer of the switching element which is not illustrated is located between the first insulating substrate 10 and the first insulating film 11. The first insulating film 11 is arranged also on the first insulating substrate 10. The gate line G1 and the gate line G2 are formed on the first insulating film 11, and covered with the second insulating film 12. The second insulating film 12 is arranged also on the first insulating film 11. The source line S1 and the source line S2 are formed on the second insulating film 12, and covered with the third insulating film 13. The third insulating film 13 is arranged also on the second insulating film 12. In addition, although not explained in detail, the third insulating film 13 also covers the switching element. The third insulating film 13 is formed of a transparent resin material, for example.

The first common electrode CE1 is formed on the third insulating film 13. That is, the third insulating film 13 is interposed between the source lines S1, S2 and the first common electrode CE1. As shown in the figure, while the first common electrode CE1 is arranged on the source line S1 and the source line S2, the first common electrode CE1 extends to inside of the pixel (a region between the source line S1 and the source line S2) and to adjacent pixels in the first direction X. The aperture portion OP of the first common electrode CE1 is formed in a position apart from the source line S1 and the source line S2 at equal distance, respectively. Furthermore, while the first common electrode CE1 is arranged on the gate line G1 and the gate line G2, the first common electrode CE1 extends to inside of the pixel (a region between the gate line G1 and the gate line G2) and to adjacent pixels in the second direction Y. The aperture portion OP of the first common electrode CE1 is formed in a position apart from the gate line G1 and the gate line G2 at equal distant, respectively. Moreover, the first common electrode CE1 is formed of reflective metal materials such as aluminum (Al), titanium (Ti), silver (Ag), molybdenum (Mo), tungsten (W), copper (Cu), chromium (Cr), etc. The first common electrode CE1 is covered with a fourth insulating film 14, The fourth insulating film 14 is arranged also on the third insulating film 13 in the aperture portion OP. The fourth insulating film 14 is made in a thin film thickness as compared with the third insulating film 13, for example, and formed of inorganic system materials, such as silicon nitride.

The pixel electrode PE is formed in the shape of an island on the fourth insulating film 14. That is, the fourth insulating film 14 interposed between the pixel electrode PE and the first common electrode CE1. The pixel electrode PE counters the first common electrode CE1 and its aperture portion OP.

The first end PA1 of the pixel electrode PE is arranged inside the position right above the source line S1 and the source line S2, and counters the first common electrode CE1 interposing the fourth insulating film 14 therebetween. The second end PA2 of the pixel electrode PE is arranged inside the position right above the gate line G1 and the gate line G2, and counters the first common electrode CE1 interposing the fourth insulating film 14 therebetween. The areas where the first end PA1 and second end PA2 counter the first common electrode CE1, portions above the source line S1 and the source line S2, and portions right above the gate line G1 and the gate line G2 are equivalent to a reflective display area R in the pixel PX. In this embodiment, the reflective display area R is formed at the four ends of the pixel PX in the shape of a rectangular frame.

In the area where the pixel electrode PE counters the aperture portion OP, the first insulating film 11, the second insulating film 12, the third insulating film 13, and the fourth insulating film 14 are laminated on the first insulating substrate 10, and shield material such as wirings and electrodes are not arranged except for the portion in which the pixel electrode PE is electrically connected with the switching element. The area where the pixel electrode PE counters the aperture portion OP is equivalent to the transmissive display area T in the pixel PX. In this embodiment, the transmissive display area T is formed in the shape of a rectangle in the central portion of the pixel PX.

The pixel electrode PE is formed of transmissive electric conductive materials, such as Indium Tin oxide (ITO) and Indium Zinc Oxide (IZO), for example. The pixel electrode PE is covered with a first vertical alignment film AL1.

On the other hand, the counter substrate CT is formed using the transparent second insulating substrate 30, such as a glass substrate and a resin substrate. The counter substrate CT includes a shield layer 31, a color filter 32, an overcoat layer 33, and a second common electrode CE2 and a second vertical alignment film AL2, etc., facing the array substrate AR.

The shield layer 31 defines each pixel PX in the active area ACT, and forms the aperture AP. The shield layer 31 is located right above wiring portions, such as the gate line G1, the gate line G2, the source line S1, the source line S2, and the switching element. The shield layer 31 is formed of metal material or black resin material having light blocking effect.

The color filter 32 is formed in the aperture AP, and its portion overlaps with the shield layer 31. The color filter 32 is formed of resin materials colored in red, green and blue, respectively, for example. The colors of pixels adjoining in the first direction X are different each other. For example, a red color filter, a green color filter, and a blue color filter are arranged in a line with this order. The boundary between the color filters 32 in different colors is located in a position which overlaps with the shield layer 31.

The overcoat layer 33 covers the color filter 32. The overcoat layer 33 makes flat unevenness of the shield layer 31 and the color filter 32. The overcoat layer 33 is formed of a transparent resin material.

The second common electrode CE2 is formed on the overcoat layer 33 facing the array substrate AR. As shown in the figure, while the second common electrode CE2 faces the pixel electrode PE, the second common electrode CE2 faces the first common electrode CE1 outside the first end PA1 and the second end PA2 of the pixel electrode PE. That is, the first common electrode CE1 faces the second common electrode CE2 without interposing the pixel electrode PE above the gate line G1, the gate line G2, the source line S1, and the source line S2. A slit SL is formed in the position in which the pixel electrode PE faces the second common electrode CE2. The second common electrode CE2 is formed of transparent electric conductive materials, such as ITO and IZO, for example. The second common electrode CE2 is covered with a second vertical alignment film AL2.

The first vertical alignment film AL1 and the second vertical alignment film AL2 are formed of the material which shows vertical alignment characteristics. The first and second alignment films have alignment strength to regulate the liquid crystal molecules in a normal direction with respect to the substrates without needing alignment treatments such as rubbing.

The array substrate AR and the counter substrate CT as mentioned-above are arranged so that the first vertical alignment film AL1 and the second vertical alignment film AL2 face each other. In this case, a pillar-shaped spacer is formed integrally with one of the substrates by resin material between the first vertical alignment film AL1 on the array substrate AR and the second vertical alignment film AL2 on the counter substrate CT. The liquid crystal layer LQ is held in a cell gap formed between the array substrate AR and the counter substrate CT. i.e., between the first vertical alignment film AL1 and the second vertical alignment film AL2. For example, the liquid crystal layer LQ is formed of liquid crystal material whose dielectric anisotropy is negative (negative-type). In the respective transmissive display area T and reflective display area R, the thickness of the liquid crystal layer LQ, i.e., the cell gap is equal to each other.

A backlight BL is arranged in the liquid crystal display panel LPN at the back side. As the backlight BL, although various types are applicable, the explanation about detailed structure is omitted herein.

A first optical element OD1 is arranged on the external surface of the first insulating substrate 10. A second optical element OD2 is arranged on the external surface of the second insulating substrate 30. The first optical element OD1 and second optical element OD2 are constituted as a circularly polarizing plate equipped with a polarization plate and a quarter wave plate. In addition, the polarization plate contained in first optical element OD1 and the polarization plate contained in second optical element OD2 are arranged so that their polarizing axes cross at right angles for example, i.e., with a Crossed Nicola relationship.

Next, operation of the liquid crystal display device in this embodiment is explained.

In the liquid crystal display device having the above-mentioned structure, at the time OFF, i.e., electric potential difference is not formed between the pixel electrode PE and the first and second common electrodes CE1 and CE2, the liquid crystal molecule contained in the liquid crystal layer LQ is initially aligned substantially in the vertical direction with respect to the substrate surface (X-Y plane) between the first vertical alignment film AL1 and the second vertical alignment film AL2. That is, retardation $\Delta n \cdot d$ ($\Delta n$ is refractive-index anisotropy of the liquid crystal layer LQ, and d is equivalent to the thickness of the liquid crystal layer LQ or the cell gap) in the liquid crystal layer LQ is substantially zero.

At this time, the backlight from the backlight BL enters from the first optical element OD1, and is changed into circular polarization of light. Then the backlight enters into the liquid crystal display panel LPN. Since the polarization state of the circular polarization of light which entered into the liquid crystal display panel LPN hardly changes when passing the liquid crystal layer LQ, the circular polarization of light which penetrates the transmissive display area T of the liquid crystal display panels LPN is absorbed by the second optical element OD2 (black display).

Moreover, the light from outside which enters toward the liquid crystal display panel LPN from the second optical element OD2 is changed into the circular polarization of light, and enters into the liquid crystal display panel LPN. The polarization state of the circular polarization of light which entered into the liquid crystal display panel LPN hardly changes when passing the liquid crystal layer LQ, but is reflected by the first common electrode CE1. For this reason, the circular polarization of light reflected in the reflective display area R of the liquid crystal display panels LPN is absorbed by the second optical element OD2 (black display).

On the other hand, in the state of ON in which potential difference is formed between the pixel electrode PE and the first common electrode CE1, and between the pixel electrode PE and the second common electrode CE2 (i.e., state where voltage is impressed to the liquid crystal layer LQ), while vertical electric field is formed between the pixel electrode PE and second common electrode CE2, inclined electric field from the pixel electrode PE is formed so as to avoid the slit SL of the second common electrode CE2. Moreover, in the outside, i.e., right above the source line S1 and the source line S2, or the gate line G1 and the gate line G2, an equipotential surface is formed between the first common electrode CE1 and the second common electrode CE2. Herein, since the liquid crystal layer LQ is a negative type, the liquid crystal molecule between the pixel electrode PE and second common electrode CE2 is aligned in a different direction from an initial alignment direction due to the inclined electric field. That is, since the negative type liquid crystal molecule is aligned so that the long axis may cross the electric field, the liquid crystal molecule aligns in an oblique direction or a horizontal direction with respect to the substrate surface in the ON state. Moreover, the liquid crystal molecule between the first common electrode CE1 and the second common electrode CE2 hardly receives the influence by the electric field and maintains the initial alignment state (substantially in the vertical direction with respect to the substrate surface). Since the alignment state of the liquid crystal molecule changes continuously, the liquid crystal molecules overlapping with the first end PA1 and the second end PA2 of the pixel electrode PE are aligned in an intermediate alignment state between the alignment state aligned substantially in the horizontal direction with respect to the substrate surface in the central portion of the pixel electrode PE and the alignment state substantially in the vertical direction with respect to the substrate surface in the outside of the pixel electrode PE. For this reason, while, in the transmissive display area T which overlaps with the central portion of the pixel electrode PE, the retardation of the liquid crystal layer LQ becomes approximately ½ waves, in the reflective display area R which overlaps with the first end PA1 and the second end PA2 in the pixel electrode PE, the retardation of the liquid crystal layer LQ becomes approximately ¼ waves.

At this time, the backlight from the backlight BL enters from the first optical element OD1, and is changed into counterclockwise circular polarization of light and enters into the liquid crystal display panel LPN. The polarization state of the circular polarization of light which entered into the liquid crystal display panel LPN changes according to the alignment state of the liquid crystal molecule when passing the liquid crystal layer LQ. The penetration light in the transmissive display area T in the liquid crystal display panels LPN is changed into clockwise circular polarization of light by retardation of ½ waves in the liquid crystal layer LQ, and penetrates the second optical element OD2 (white display).

Moreover, the outside light which enters toward the liquid crystal display panel LPN from the second optical element OD2 is changed into clockwise circular planarization of light and enters into the liquid crystal display panel LPN. The circular planarization of light which entered into the liquid crystal display panel LPN is changed into linearly polarized light by the retardation of ¼ waves in the liquid crystal layer LQ during reaching to the first common electrode CE1. After being reflected by the first common electrode CE1, the light is again changed into clockwise circular polarization of light by retardation of ¼ waves in the liquid crystal layer LQ, and then passes the second optical element OD2 (white display).

Moreover, in the ON state, the storage capacitance CS is formed by the pixel electrode PE and the first common electrode CE1 facing each other interposing the fourth insulating film 14, and the capacitance required to display the pixel is held. That is, the pixel potential written in each pixel through the switching element SW is held by the above storage capacitance CS for a predetermined period.

According to this embodiment, the capacitance required to display pictures in each pixel can be formed by the pixel electrode PE and the first common electrode CE1 facing each other interposing the fourth insulating film 14. For this reason, when forming the capacitance, it becomes not necessary to arrange the wirings or electrodes formed of materials with the light shielding effect so as to cross the pixel. Moreover, the fourth insulating film 14 is formed so that the fourth insulating film 14 has thin film thickness as compared with the third insulating film formed with resin material, etc. For this reason, it becomes possible to easily form comparatively large capacitance by the pixel electrode PE and first common electrode CE1 facing each other interposing the fourth insulating film 14. In addition, it becomes possible to raise the aperture ratio, transmissive ratio and brightness in the transmissive area T per one pixel contributing to the display.

Moreover, since the first common electrode CE1 functions as a reflective electrode, the area in which the pixel electrode PE overlaps with the first common electrode CE1 contributes to the display as the reflective display area R. The reflective display area R includes not only the region in which the pixel electrode PE overlaps with the first common electrode CE1, but the region outside of the pixel electrode PE, i.e., the region right above the source line S1, the source line S2, and the region right above the gate line G1 and the gate line G2. Accordingly, it becomes possible to make large the reflective display area R without reducing the transmissive display area T, and to improve aperture ratio, reflectance ratio, or brightness per one pixel. Therefore, it becomes possible to improve the display grace of both the transmissive display and the reflective display, while securing the capacitance required for the display.

While the first common electrode CE1 is located on the source line S1 and the source line S2, the first common electrode CE1 extends toward inside of the pixel PX. For this reason, in the ON state, it becomes possible to shield undesired leaked electric field which goes to the liquid crystal layer LQ from the source line S1 and the source line S2 by the first common electrode CE1. That is, it is possible to suppress the undesired formation of the electric field or capacitance between the source lines S1, S2, and the pixel electrode PE, or between the source lines S1, S2 and the second common electrode CE2, and to control alignment disorder of the liquid crystal molecule LM in the region which overlaps with the source line S1 and the source line S2.

Also, in the ON state, since the first common electrode CE1 and second common electrode CE2 are maintained with the same potential, the liquid crystal molecule LM in the region which overlaps with the source line S1 and the source line S2 maintains the initial alignment state. Therefore, it becomes possible to make the pixel electrodes PE adjoining in the first direction X each other close to manufacturing process limitations, and to further expand the area contributing to the display in one pixel.

Moreover, even if one pixel is in the ON state and another pixel is in the OFF state in the adjoining pixels sandwiching the source line, the liquid crystal molecule LM in the region which overlaps with the source line is maintained in the initial alignment state. Accordingly, it becomes possible to control degradation of the display grace by mixed colors even if it is a case where the liquid crystal display panel LPN is viewed from an oblique direction. Moreover, since the reflective first common electrode CE1 with a large width is arranged in the position which is closer to the shield layer 31 than the source line S1 and the source line S2 in the array substrate AR, it becomes possible to expand the viewing angle range which can control the mixed-colors Moreover, since it becomes unnecessary to expand the width of the shield layer 31 for preventing the mixed-colors, it becomes possible to further expand the area which contributes to the display in one pixel. As an example, the width of the shield layer 31 located above the source line S1 and the source line S2 may be substantially equal to the width of the source line S1 and the source line S2.

In the first common electrode CE1, the extending length toward the inside of the pixel PX is set so that the leaked electric field from the source line S1 and the source line S2 is shielded, necessary capacitance between the first common electrode CE1 and the pixel electrodes PE is secured, and the area required for the reflective display area R in one pixel PX (or the area required for the transmissive display area T) is secured. If the above condition is satisfied only with the first common electrode CE1 arranged along the source line S1 and the source line S2, it is not necessarily needed to arrange the first common electrode CE1 above the gate line G1 and the gate line G2. That is, it is necessary to arrange the first common electrode CE1 above the gate line G1 and the gate line G2 and extend it toward inside of the pixel PX in cases where the leaked electric field from the gate line G1 and the gate line G2 are required to be shield, required amount of the storage capacitance is insufficient between the pixel electrodes PE and the first common electrode CE1, and the area of the reflective display area R needed in each pixel PX is insufficient. Furthermore, when the first common electrode CE1 is not arranged on the gate line, the display may become dark due to inappropriate alignment of the liquid crystal molecule in the circumference of the pixel electrode PE end near the gate line as a transmissive area. However, when arranging the first common electrode CE1 above the gate line like this embodiment, since the liquid crystal molecule in the circumference of the pixel electrode PE end is aligned appropriately, i.e., the inclination of the liquid crystal molecule becomes small, the pixel electrode PE end near the gate line can be used efficiently as the reflective display area resulting in improvement of luminosity.

Figure 6:
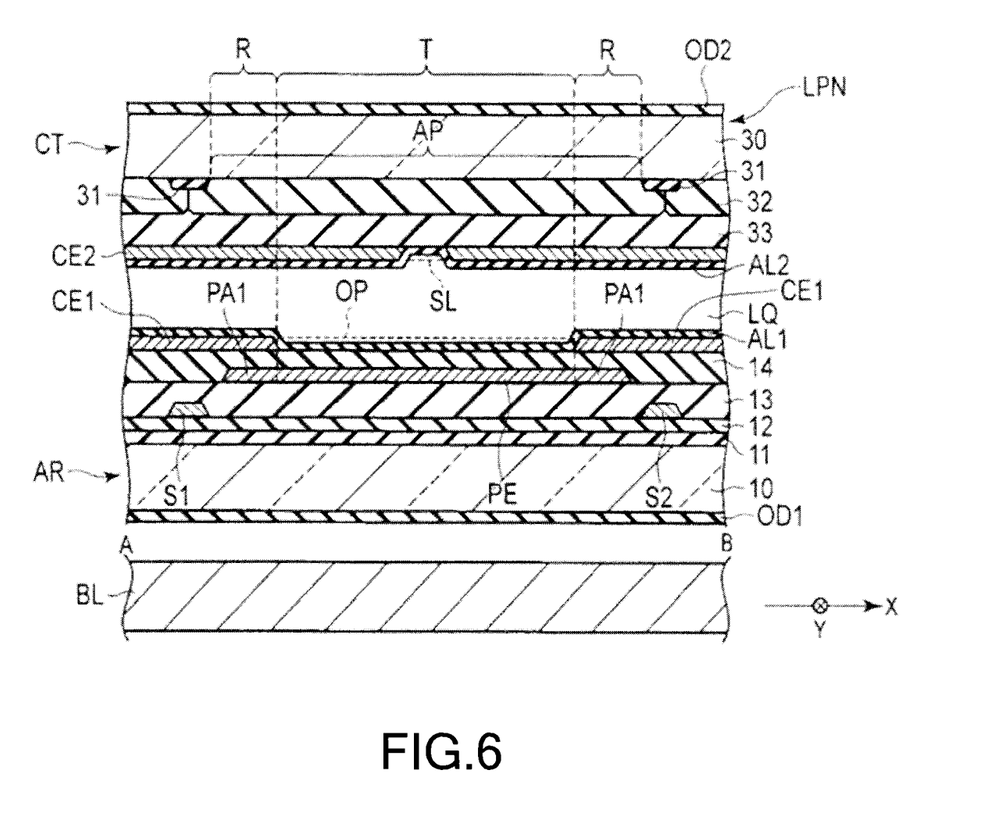
FIG. 6 is a cross-sectional view schematically showing the structure of the liquid crystal display panel LPN taken along line A-B shown in FIG. 3 according to a second embodiment.

FIG. 6 is a cross-sectional view schematically showing the structure of the liquid crystal display panel LPN taken along line A-B shown in FIG. 3 according to a second embodiment.

The second embodiment is different from the first embodiment in a point that the first common electrode CE1 is located in the upper layer than the pixel electrode PE in the array substrate AR, and the same as in other structures.

That is, the pixel electrode PE is formed in the shape of an island on the third insulating film 13. The third insulating film 13 is interposed between the source lines S1, S2, and the pixel electrode PE. The pixel electrode PE is located inside the position right above the source line S1 and the source line S2. The pixel electrode PE is formed of transparent conductive material like the first embodiment. The pixel electrode PE is covered with the fourth insulating film 14. The fourth insulating film 14 is arranged also on the third insulating film 13 on the outside of the pixel electrode PE.

The first common electrode CE1 is formed on the fourth insulating film 14. That is, the fourth insulating film 14 is interposed between the pixel electrode PE and the first common electrode CE1. As shown in the figure, while the first common electrode CE1 is located above the source line S1 and the source line S2, the first common electrode CE1 extends toward the inside (between the source line S1 and the source line S2) of the pixel from the positions above the source line S1 and the source line S2, and also the outside of the pixel, respectively. The aperture portion OP of the first common electrode CE1 is formed in the position with equal distance from each of the source line S1 and the source line S2. In addition, although illustration is omitted, while the first common electrode CE1 is located above the gate line G1 and the gate line G2, the first common electrode CE1 extends toward the inside (between the gate line G1 and the gate line G2) of the pixel from the positions above the gate line G1 and the gate line G2, and also the outside of the pixel, respectively. The first common electrode CE1 is formed of the reflective metal material like the first embodiment. The first common electrode CE1 is covered with the first vertical alignment film AL1. The first vertical alignment film AL1 is arranged also on the fourth insulating film 14 in the aperture portion OP.

The pixel electrode PE counters the first common electrode CE1 and its aperture portion OP. The region in which the pixel electrode PE faces the first common electrode CE1, portions of the regions above the source line S1 and the source line S2, and portions of the regions right above the gate line G1 and the gate line G2 are equivalent to the reflective display area R in the pixel. On the other hand, the region in which the pixel electrode PE counters the aperture portion OP is equivalent to the transmissive display area T in the pixel.

Also in the second embodiment, the same effect as the first embodiment is acquired. Moreover, in the second embodiment, since the first common electrode CE1 is arranged closer to the shield layer 31 than the first embodiment, it becomes possible to further expand the viewing angle range which can control the mixed colors.

As explained above, according to the embodiments, the liquid crystal display device capable improving display grace can be supplied.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall within the scope and spirit of the inventions.

What is claimed is:

1. A liquid crystal display device, comprising:
    a first substrate including;
        first and second gate lines extending in a first direction,
        first and second source lines extending in a second direction orthogonally crossing the first direction,
        a switching element electrically connected with the first gate line and the first source line,
        a reflective first common electrode located on the first and second source lines and extending toward a region between the first and second source lines so as to form an aperture portion,
        a transmissive pixel electrode arranged in a pixel defined by the first gate line, the second gate line, the first source line and the second source line and electrically connected with the switching element, the transmissive pixel electrode including a first end extending along the first and second source lines so as to face the first common electrode, and
        a first vertical alignment film,
    a second substrate including a second common electrode arranged facing the pixel electrode and set to the same potential as the first common electrode, and a second vertical alignment film covering the second common electrode; and
    a liquid crystal layer held between the first vertical alignment film and the second vertical alignment film.

2. The liquid crystal display device according to claim 1, wherein
    the first substrate includes a first interlayer insulating film interposed between the first and second source lines and the first common electrode, and a second interlayer insulating film interposed between the first common electrode and the pixel electrode, and
    the first vertical alignment film covers the pixel electrode.

3. The liquid crystal display device according to claim 1, wherein
    the first common electrode is located on the first and second gate lines, and extends toward a region between the first and second gate lines, and
    the pixel electrode includes a second end facing the first common electrode and extending along the first and second gate lines.

4. The liquid crystal display device according to claim 3, wherein the first common electrode faces the second common electrode in the outside of the first and second ends.

5. The liquid crystal display device according to claim 1, wherein the second common electrode includes a slit arranged in a position in which the second common electrode faces the pixel electrode.

6. The liquid crystal display device according to claim 1, wherein the second substrate includes a shield layer above the first and second source lines, and the width of the shield layer is substantially equal to the widths of the first and second source lines.

7. A liquid crystal display device, comprising:
    a first substrate including;
        first and second gate lines extending in a first direction,
        first and second source lines extending in a second direction orthogonally crossing the first direction,
        a switching element electrically connected with the first gate line and the first source line,
        a reflective first common electrode located on the first and second source lines and extending toward a region between the first and second source lines so as to form an aperture portion,
        a transmissive pixel electrode arranged in a pixel defined by the first gate line, the second gate line, the first source line and the second source line and electrically connected with the switching element, the transmissive pixel electrode including a first end extending along the first and second source lines so as to face the first common electrode, and
        a first vertical alignment film,
    a second substrate including a second common electrode arranged facing the pixel electrode and set to the same potential as the first common electrode, and a second vertical alignment film covering the second common electrode; and
    a liquid crystal layer held between the first vertical alignment film and the second vertical alignment film, wherein
    the first substrate includes a first interlayer insulating film interposed between the first and second source lines and the first common electrode, and a second interlayer insulating film interposed between the first common electrode and the pixel electrode, and the first vertical alignment film covers the pixel electrode,
    the first common electrode is located on the first and second gate lines, and extends toward a region between the first and second gate lines,
    the pixel electrode includes a second end facing the first common electrode and extending along the first and second gate lines,
    the first common electrode faces the second common electrode in the outside of the first and second ends,
    the second common electrode includes a slit arranged in a position in which the second common electrode faces the pixel electrode, and
    the second substrate includes a shield layer above the first and second source lines, and the width of the shield layer is substantially equal to the widths of the first and second source lines.

8. A liquid crystal display device, comprising:
    a first substrate including;
        first and second gate lines extending in a first direction,
        first and second source lines extending in a second direction orthogonally crossing the first direction,
        a switching element electrically connected with the first gate line and the first source line,
        a reflective first common electrode located on the first and second source lines and extending toward a region between the first and second source lines so as to form an aperture portion, a transmissive pixel electrode arranged in a pixel defined by the first gate line, the second gate line, the first source line and the second source line and electrically connected with the switching element, the transmissive pixel electrode including a first end extending along the first and second source lines so as to face the first common electrode, and a first vertical alignment film, a second substrate including a second common electrode arranged facing the pixel electrode and set to the same potential as the first common electrode, and a second vertical alignment film covering the second common electrode; and a liquid crystal layer held between the first vertical alignment film and the second vertical alignment film, wherein the first substrate includes a first interlayer insulating film interposed between the first and second source lines and the pixel electrode, and a second interlayer insulating film interposed between the first common electrode and the pixel electrode, and the first vertical alignment film covers the first common electrode.

9. The liquid crystal display device according to claim 8, wherein the first common electrode is located on the first and second gate lines, and extends toward a region between the first and second gate lines, the pixel electrode includes a second end facing the first common electrode and extending along the first and second gate lines, and the first common electrode faces the second common electrode in the outside of the first and second ends.

10. The liquid crystal display device according to claim 8, wherein the second common electrode includes a slit arranged in a position in which the second common electrode faces the pixel electrode, and the second substrate includes a shield layer above the first and second source lines, and the width of the shield layer is substantially equal to the widths of the first and second source lines.

11. A liquid crystal display device including a plurality of pixels, comprising:

a first substrate including;

first and second gate lines extending in a first direction, first and second source lines extending in a second direction orthogonally crossing the first direction, a switching element electrically connected with the first gate line and the first source line, a reflective first common electrode located on the first and second source lines extending toward a region between the first and second source lines so as to form an aperture portion, and the reflective first common electrode extending to adjacent pixels in the first direction, a transmissive pixel electrode arranged in a pixel defined by the first gate line, the second gate line, the first source line and the second source line and electrically connected with the switching element, wherein the transmissive pixel electrode includes a first end extending along the first and second source lines so as to face the first common electrode, and is arranged on the aperture portion of the first common electrode, and a first vertical alignment film, a second substrate including a second common electrode arranged facing the pixel electrode and set to the same potential as the first common electrode, and a second vertical alignment film covering the second common electrode; and a liquid crystal layer held between the first vertical alignment film and the second vertical alignment film, wherein the aperture portion of the reflective first common electrode forms a transmissive display region, and the first end of the transmissive pixel electrode arranged on the first common electrode forms a reflective display region.

12. The liquid crystal display device according to claim 11, wherein the first common electrode is located on the first and second gate lines, and extends toward a region between the first and second gate lines, the pixel electrode includes a second end facing the first common electrode and extending along the first and second gate lines, and the first common electrode faces the second common electrode in the outside of the first and second ends.

13. The liquid crystal display device according to claim 11, wherein the second common electrode includes a slit arranged in a position in which the second common electrode faces the pixel electrode.

14. The liquid crystal display device according to claim 11, wherein the second substrate includes a shield layer above the first and second source lines, and the width of the shield layer is substantially equal to the widths of the first and second source lines.

* * * * *